US010931576B2

(12) United States Patent
An et al.

(10) Patent No.: US 10,931,576 B2
(45) Date of Patent: Feb. 23, 2021

(54) SOFTWARE DEFINED NETWORKING SYSTEM FOR DISTINGUISHING PACKET-IN MESSAGES

(71) Applicant: HUAWEI TECHNOLOGIES CO.,LTD., Guangdong (CN)

(72) Inventors: Xueli An, Munich (DE); Clarissa Marquezan, Munich (DE); Zoran Despotovic, Munich (DE); Ishan Vaishnavi, Munich (DE); Artur Hecker, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 16/203,638

(22) Filed: Nov. 29, 2018

(65) Prior Publication Data

US 2019/0097927 A1 Mar. 28, 2019

Related U.S. Application Data

(63) Continuation of application No. PCT/EP2016/062319, filed on Jun. 1, 2016.

(51) Int. Cl.
*H04L 12/715* (2013.01)
*H04L 12/721* (2013.01)
(Continued)

(52) U.S. Cl.
CPC ............ *H04L 45/64* (2013.01); *H04L 43/026* (2013.01); *H04L 45/38* (2013.01); *H04L 45/74* (2013.01);
(Continued)

(58) Field of Classification Search
CPC ....... H04L 45/64; H04L 43/026; H04L 69/22; H04L 47/33; H04L 45/74; H04L 45/38; H04L 41/0816
See application file for complete search history.

(56) References Cited

U.S. PATENT DOCUMENTS

2016/0234103 A1\* 8/2016 Kotalwar ................ H04L 45/38
2016/0269432 A1   9/2016 Lin et al.
(Continued)

FOREIGN PATENT DOCUMENTS

CN    102868645 A    1/2013
CN    103490996 A    1/2014
(Continued)

OTHER PUBLICATIONS

"OpenFlow Switch Specification," Version 1.5.1 (Protocol version 0x06 ),Open Networking Foundation, pp. 1-283 (Mar. 26, 2015).
(Continued)

*Primary Examiner* — Kiet Tang
(74) *Attorney, Agent, or Firm* — Leydig, Voit & Mayer, Ltd.

(57) ABSTRACT

The application provides a switch device and a software defined network (SDN) controller. The switch device includes a storage unit configured to store control flow entries, each control flow entry comprises at least one service field associated with at least one processing action, a receiver configured to receive a data plane packet, and a transmitter configured to transmit, to the SDN controller, a packet-in message, and a processor configured to determine whether at least one information field of the data plane packet or of the packet-in message matches the at least one service field of a control flow entry, and instruct the transmitter to transmit the packet-in message according to the processing action associated with the matched service field, if the at least one information field matches the at least one service field.

18 Claims, 12 Drawing Sheets

(51) Int. Cl.
  *H04L 29/06*  (2006.01)
  *H04L 12/26*  (2006.01)
  *H04L 12/741* (2013.01)
  *H04L 12/801* (2013.01)
  *H04L 12/24*  (2006.01)

(52) U.S. Cl.
  CPC ............. *H04L 47/33* (2013.01); *H04L 69/22* (2013.01); *H04L 41/0816* (2013.01)

(56) References Cited

U.S. PATENT DOCUMENTS

| | | | |
|---|---|---|---|
| 2017/0149659 A1* | 5/2017 | K | H04L 45/02 |
| 2017/0207994 A1* | 7/2017 | Lin | H04L 45/02 |
| 2018/0198704 A1* | 7/2018 | Viquez | H04L 49/15 |

FOREIGN PATENT DOCUMENTS

| | | |
|---|---|---|
| CN | 104660565 A | 5/2015 |
| CN | 104767720 A | 7/2015 |

OTHER PUBLICATIONS

Kotani, "Packet-In Message Control for Reducing CPU Load and Control Traffic in OpenFlow Switches," 2012 European Workshop on Software Defined Networking, pp. 1-6 (2012).

"NGMN Alliance 5G White Paper," 1.0, NGMN 5G Initiative, pp. 1-125 (Feb. 17, 2015).

"3rd Generation Partnership Project; Technical Specification Group Services and System Aspects; Feasibility Study on New Services and Markets Technology Enablers; Stage 1 (Release 14)," 3GPP TR 22.891 V14.0.0, pp. 1-95, 3rd Generation Partnership Project—Valbonne, France (Mar. 2016).

3rd Generation Partnership Project; Technical Specification Group Services and System Aspects; Policy and charging control architecture (Release 13), 3GPP TS 23.203 V13.7.0, pp. 1-242, 3rd Generation Partnership Project—Valbonne, France (Mar. 2016).

"OpenFlow Switch Specification, Version 15.0 ( Protocol version 0x06 )," pp. 1-277, Open Networking Foundation, OpenFlow (Dec. 19, 2014).

Nichols et al., "Definition of the Differentiated Services Field (DS Field) in the IPv4 and IPv6 Headers," Request for Comments: 2474, pp. 1-20, Network Working Group (Dec. 1998).

Trivisonno et al., "SDN-based 5G mobile networks: architecture, functions, procedures and backward compatibility", Transactions on Emerging Telecommunications Technologies; Trans. Emerging Tel. Tech., pp. 1-11, International Union of Telecommunication—Geneva, Switzerland (2014).

\* cited by examiner

```
/* Action structure for OFPAT_SET_QUEUE. */
struct ofp_action_set_queue {
    uint16_t type;     /* OFPAT_SET_QUEUE. */
    uint16_t len;      /* Len is 8. */
    uint32_t queue_id; /* Queue id for the packets. */
};
OFP_ASSERT(sizeof(struct ofp_action_set_queue) == 8);
```

SOFTWARE DEFINED NETWORKING SYSTEM FOR DISTINGUISHING PACKET-IN MESSAGES

CROSS-REFERENCE TO RELATED APPLICATIONS

This application is a continuation of International Application No. PCT/EP2016/062319, filed on Jun. 1, 2016, the disclosure of which is hereby incorporated by reference in its entirety.

TECHNICAL FIELD

The present application relates to the field of software defined networking (SDN), and in particular to an Open Flow (OF) switch, an SDN controller, and methods respectively performed by these entities. Specifically, the present application is directed at distinguishing packet-in messages, in particular included in control packets, which are exchanged between the OF switch and the SDN controller.

BACKGROUND

SDN is an approach to improve communication networks by decoupling a data plane from a control plane. Thereby, control plane functions are typically provided by the SDN controller, while data plane functions are typically provided by network elements, such as switches.

An illustration of a conventional SDN architecture 100 is shown in FIG. 1. An SDN controller 101, which is associated with the control plane, communicates through a southbound application programming interface (API) with network elements (here with switches 102), which are associated with the data plane. This allows exchanging control packets between the SDN controller 101 and the switches 102, which in turn enables the SDN controller 101 to configure and manage the switches 102, or to receive events from the switches 102.

OF is a protocol that typically implements the southbound API. The switches 102 may also be called OF switches, in case that the OF protocol is used. Through a northbound API, the SDN controller 101 can additionally communicate with SDN applications 103, which are associated with an application plane. This enables the SDN applications 103 to provide processing logic to the SDN controller 101, e.g. in order to manipulate a network state of the data plane.

Data plane traffic between the switches 102 is exchanged by means of data plane packets. Control plane traffic between one of the switches 102 and the SDN controller 101 is exchanged by means of the control packets. In case that the OF protocol is used to implement the southbound API, the control packets can also be called OF messages, and a communication channel between one of the switches 102 and the SDN controller 101 can be called an OF channel.

Among the OF messages, an OFPT_PACKET_IN or packet-in (PI) message is a message that is sent by one of the switches 102 to the SDN controller 101, in order to inform the SDN controller 101 about unknown data plane traffic arrival at the switch 102, or about a state change of the switch 102. After the SDN controller 101 receives the PI message from the switch 102, a reconfiguration of the switch 102 can be enforced by the SDN controller 101, particularly supported by at least one SDN application 103.

At the switches 102, different kinds of unknown data plane traffic can arrive, which may need to be processed according to different performance requirements. Conventional solutions such as Differentiated Services (DiffServ) or traffic labeling (e.g. Multiprotocol Label Switching (MPLS)) facilitate distinguishing different kinds of data plane traffic.

These conventional solutions can also be used to distinguish between different types of control packets, e.g. OF messages of different types. However, it is not possible to distinguish between OF messages of the same type. As a result, it is not possible to distinguish between PI messages, or control packets including PI messages, which are triggered by different kinds of unknown data plane traffic.

Chinese Patent No. 102868645 A discloses an approach to distinguish OF messages by labeling them with different differentiated services code point (DSCP) values according to an OF message type of the OF message. This enables differentiating PI messages from other types of OF messages, but still fails to provide a way to distinguish PI messages from each other.

Egress processing according to the OF protocol specification is a conventional solution to modify header fields of data plane packets, which are sent by a switch. However, as control packets are generated after the egress processing of the data plane packets, egress processing cannot be applied to the control packets, and therefore is not able to distinguish OF messages (e.g. PI messages) of the same type.

As a result, in all conventional solutions the problem still exists, that it is not possible to distinguish, whether a PI message was triggered by unknown data plane traffic with high or low performance requirements, when the PI message is being processed by the network elements 102 or the SDN controller 101.

SUMMARY

In view of the above-mentioned problem of the conventional solution, the present application aims to improve the state of the art.

The present application has particularly the object to provide an OF switch, an SDN controller, and a system, which improve control plane traffic differentiation. A further aim of the application is to allow that OF messages, in particular PI messages triggered by different kinds of unknown data plane traffic, can be generated and transported according to predefined performance requirements, which are enforced by an SDN controller. This would allow for faster processing of PI messages in the control plane and the data plane according to the type of the PI messages. More specifically, the present application intends to enable transmitting PI messages according to predefined processing actions. This would enable the distinguishing of PI messages, when processed by the network elements or the SDN controller.

The above-mentioned object of the present application is achieved by the solution provided in the enclosed independent claims. Advantageous implementations of the present application are further defined in the respective dependent claims.

According to a first aspect, the application provides an Open Flow (OF) switch, comprising a storage unit adapted to store control flow entries, each control flow entry comprising at least one service field associated with at least one processing action, a receiver adapted to receive a data plane packet, and a transmitter adapted to transmit, to a software defined network (SDN) controller, a packet-in message, and a processor adapted to determine, whether at least one information field of the data plane packet or of the packet-in message matches the at least one service field of a control flow entry, and instruct the transmitter to transmit the packet-in message according to the processing action associated with the matched service field, if the at least one information field matches the at least one service field.

The OF switch of the first aspect is thus able to send packet-in messages based on processing actions corresponding to the packet-in messages. Thus, at the SDN controller, the packet-in messages can be distinguished, and consequently packet-in messages can be distinguished from each other in the control channel. This further allows the SDN controller to process the packet-in messages faster and more efficiently and according to individual performance requirements.

According to a first implementation of the first aspect, the processor further can be adapted to instruct the transmitter to transmit the packet-in message according to a default processing action if the at least one information field does not match any service filed.

This further allows the SDN controller to process the packet-in messages faster and more efficiently and according to default processing settings.

According to a second implementation of the first aspect, the at least one service field can include type and/or ownership information of data plane packets.

Thus, packet-in messages can be distinguished by type or owner, and can accordingly be processed by the SDN controller, and/or by the switches for an 'in-band' control case. That is, different transportation methods can be applied to different packet-in messages, for instance, according to individual performance requirements. For example, one or more packet-in messages can be put into a priority queue of a switch.

According to a third implementation of the first aspect, the OF switch can further be adapted to compare at least one of a source IP address, a destination IP address, a source port number, a destination port number and a used protocol of the data plane packet with the at least one service field.

According to a fourth implementation of the first aspect, the processor can be adapted to compare a payload of the packet-in message with the at least one service field.

According to a fifth implementation of the first aspect, the payload of the packet-in message can comprise at least one of a source IP address, a destination IP address, a source port number, a destination port number and a used protocol obtained from the data plane packet.

The third, fourth and fifth implementation forms allow the distinguishing to take place after and before packet-in message generation (i.e. by either considering the data plane packet or the payload of the packet-in message), depending on specific requirements.

According to a sixth implementation of the first aspect, the packet-in message can be transmitted in a control packet, and the processing action can comprise labeling the control packet, and/or specifying a transportation preference of the control packet, and/or dispatching the control packet to a specific queue.

With these processing actions, the SDN controller receiving the control packet is enabled to quickly and efficiently distinguish control packets, and thus the included packet-in messages.

According to a seventh implementation of the first aspect, the storage unit can be adapted to store in each control flow entry a priority value, and if the at least one information field of the data plane packet or of the packet-in message matches service fields of more than one control flow entry, the processing action of the control flow entry with highest priority value is applied.

Thereby, it can be ensured in a simple and efficient manner that the most important packet-in messages are processed first at the SDN controller. The packet-in messages can also be distinguished by switches in the transportation network for the 'in-band' control case described above. For example, one or more packet-in messages can be put into a priority queue of a switch.

According to a second aspect, the application provides a method performed by an Open Flow (OF) switch, wherein the OF switch comprises control flow entries, each control flow entry comprising at least one service field associated with at least one processing action, the method comprising receiving a data plane packet, and transmitting, to a software defined network (SDN) controller a packet-in message; wherein the method further comprises:

determining, whether at least one information field of the data plane packet or of the packet-in message matches the at least one service field of a control flow entry, and transmitting the packet-in message according to the processing action associated with the matched service field, if the at least one information field matches the at least one service field.

According to a first implementation of the second aspect, the packet-in message can be transmitted according to a default processing action if the at least one information field does not match any service filed.

According to a second implementation of the second aspect, the at least one service field can include type and/or ownership information of data plane packets.

According to a third implementation of the second aspect, the OF switch can further compare at least one of a source IP address, a destination IP address, a source port number, a destination port number and a used protocol of the data plane packet with the at least one service field.

According to a fourth implementation of the second aspect, the OF switch can further compare a payload of the packet-in message with the at least one service field.

According to a fifth implementation of the second aspect, the payload of the packet-in message can comprise at least one of a source IP address, a destination IP address, a source port number, a destination port number and a used protocol obtained from the data plane packet.

According to a sixth implementation of the second aspect, the packet-in message can be transmitted in a control packet, and the processing action can comprise labeling the control packet, and/or specifying a transportation preference of the control packet, and/or dispatching the control packet to a specific queue.

According to a seventh implementation of the second aspect, the storage unit can store in each control flow entry a priority value, and if the at least one information field of the data plane packet or of the packet-in message matches service fields of more than one control flow entry, the processing action of the control flow entry with highest priority value is applied.

The method of the second aspect achieves all advantages of the OF switch of the first aspect.

According to a third aspect, the application provides a software defined network (SDN) controller, comprising a control flow information database adapted to store control flow entries, each control flow entry comprising at least one service field associated with at least one processing action, the SDN controller being adapted to receive a packet-in message from an Open Flow (OF) switch, determine, whether at least one information field in the packet-in message matches the at least one service field in the control flow entry, and transmit, to the OF switch, the processing action associated with the matched at least one service field, or process the packet-in message according to the processing action.

The SDN controller can thus update the OF switch with a processing action for the received packet-in message, so that the OF switch can apply this processing action for the same type of packet-in message the next time. This supports distinguishing packet-in messages from each other on the control channel.

According to a first implementation of the third aspect, the SDN controller can further be adapted to change in and/or add to the control flow information database a control flow entry, and transmit, to the OF switch, the changed control flow entry.

Thus, the SDN controller can proactively, e.g. triggered by an SDN application, update the OF switch, and can thereby, for instance, react on new/changed performance requirements.

According to a second implementation of the third aspect, the SDN controller can further be adapted to receive a control packet including the packet-in message from the OF switch, determine, whether the control packet is a labeled control packet and/or a control packet with a specified transportation preference, and/or a control packet dispatched to a specific queue, and process the control packet and/or the packet-in message according to the labelling, and/or the transportation preference, and/or the queue of the control packet.

Thereby, the SND controller can receive and distinguish control packets, and thus the included packet-in message from other packet-in messages. Accordingly, the SDN controller can process incoming packet-in messages, for instance, based on performance requirements.

According to a fourth aspect, the application provides a method performed by a software defined network (SDN) controller, wherein the SDN controller comprises a control flow information database storing control flow entries, each control flow entry comprising at least one service field associated with at least one processing action, the method comprising receiving a packet-in message from an Open Flow (OF) switch, determining, whether at least one information field in the packet-in message matches the at least one service field in the control flow entry, and transmitting, to the OF switch, the processing action associated with the matched at least one service field.

According to a first implementation of the fourth aspect, the SDN controller can further change in and/or add to the control flow information database a control flow entry, and transmit, to the OF switch, the changed control flow entry.

According to a second implementation of the fourth aspect, the SDN controller can further receive a control packet including the packet-in message from the OF switch, determine, whether the control packet is a labeled control packet and/or a control packet with a specified transportation preference, and/or a control packet dispatched to a specific queue, and process the control packet and/or the packet-in message according to the labeling, and/or the transportation preference, and/or the queue of the control packet.

The method of the fourth aspect achieves all advantages of the SDN controller of the third aspect.

According to a fifth aspect, the application provides a system comprising at least one OF switch according to the first aspect as such or anyone of the implementation forms of the first aspect, and at least one SDN controller according to the third aspect as such or anyone of the implementation forms of the third aspect.

The system of the fifth aspect achieves all advantages of the OF switch of the first aspect and the SDN controller of the third aspect, respectively.

According to a sixth aspect, the application provides a computer program comprising program code for performing the method of the second aspect as such or anyone of the implementation forms of the second aspect, or the method of the fourth aspect as such or anyone of the implementation forms of the fourth aspect.

The computer program of the sixth aspect achieves all advantages of the method of the second aspect and the method of the fourth aspect, respectively.

Generally, it has to be noted that all arrangements, devices, modules, components, models, elements, units and means and so forth described in the present application could be implemented by software or hardware elements or any kind of combination thereof. All steps which are performed by the various entities described in the present application as well as the functionality described to be performed by the various entities are intended to mean that the respective entity is adapted to, or is configured to, perform the respective steps and functionalities.

Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present application and its various steps are embodied in the functionalities of the various described apparatus elements.

BRIEF DESCRIPTION OF THE DRAWINGS

The above-described aspects and implementation forms of the present application will be explained in the following description of specific embodiments in relation to the enclosed drawings, in which:

FIG. 4 shows an exemplary source code fragment of a processing action;

DETAILED DESCRIPTION OF THE EMBODIMENTS

Figure 1:
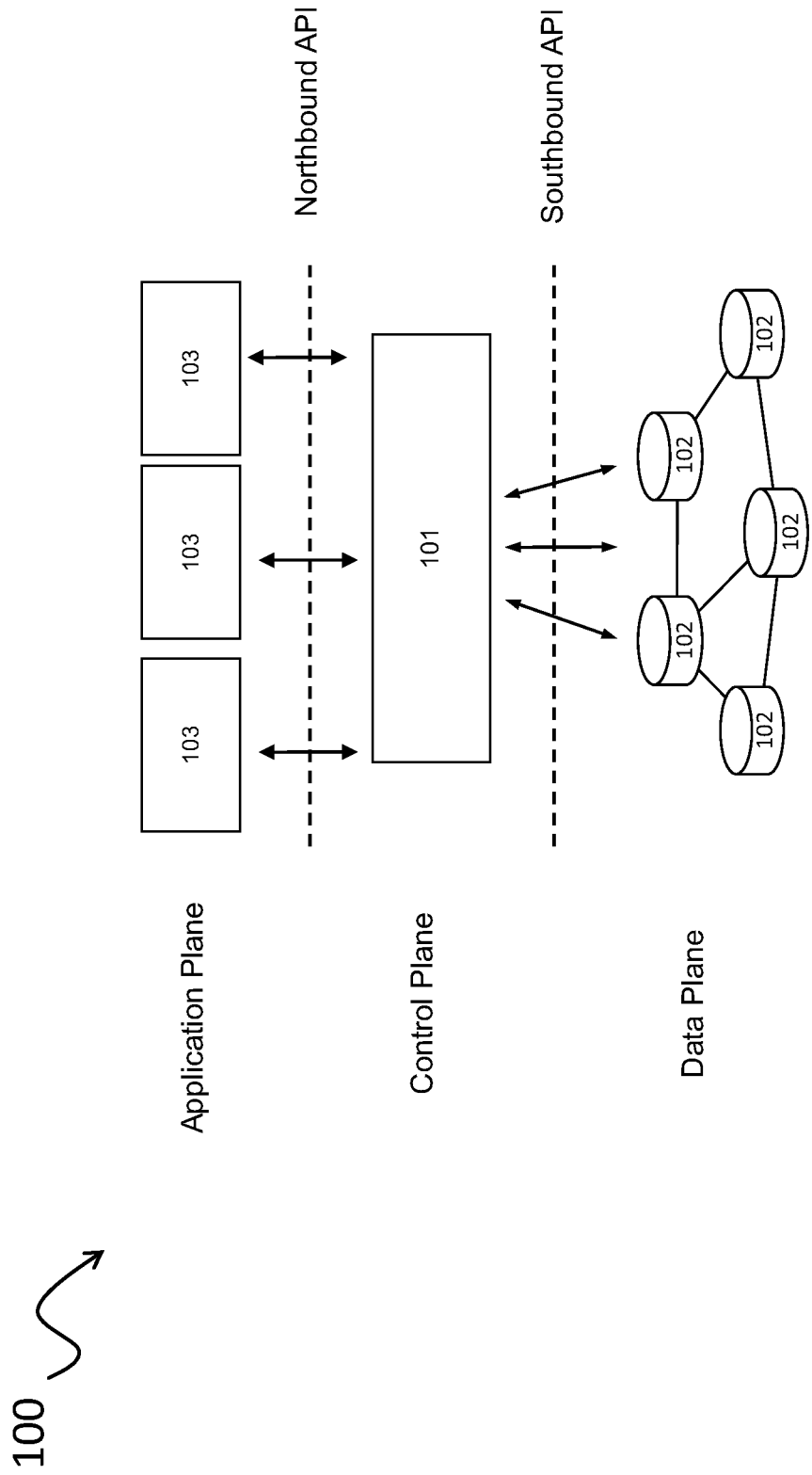
FIG. 1 shows an illustration of a conventional SDN architecture.
Figure 2:
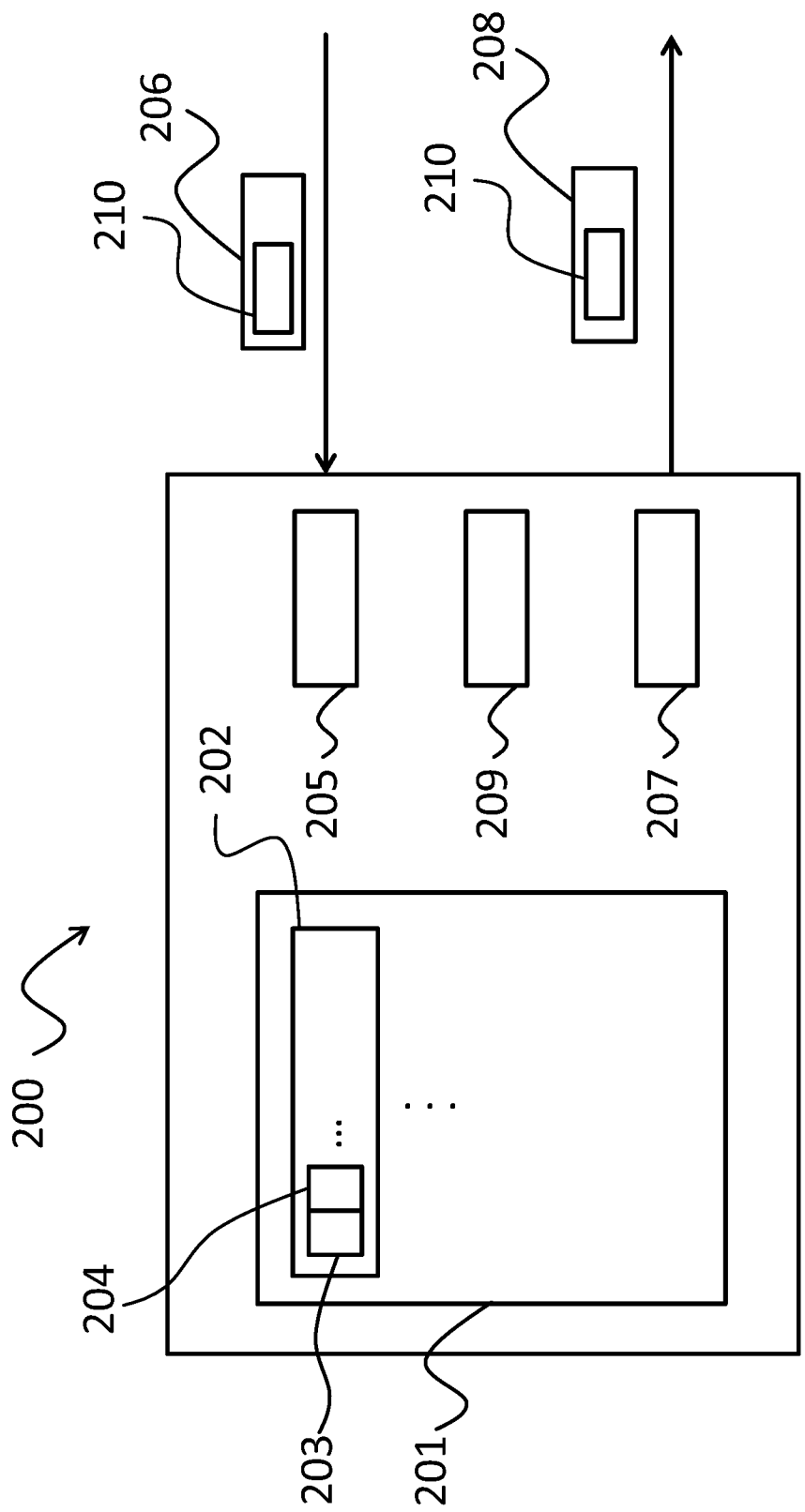
FIG. 2 shows a schematic overview of an OF switch according to an embodiment of the present application.

FIG. 2 shows a schematic overview of an OF switch 200 according to an embodiment of the present application. In order to allow for distinguishing PI messages 208, which are sent by the OF switch 200, the OF switch 200 comprises a storage unit (SU) 201, which is adapted to store control flow entries (CFEs) 202. Although there is only one CFE 202 shown in FIG. 2, the SU 201 can store also a plurality of CFEs 202. The basic operating principle of the SU (e.g. basic management operations as how to create, select and remove CFEs) can be based on the operating principle of conventional flow tables according to SDN. The conventional flow tables, which are typically used to store information on how to process data plane packets 206, are referred to as data plane flow tables (DFTs) throughout the description of the present application. In the SU 201, each control flow entry 202 can comprise at least one service field 203, which is associated with at least one processing action 204. Although there is only one service field 203 and only one processing action 204 shown within the CFE 202 of FIG. 2, the CFE 202 can also include a plurality of service fields 203 or processing actions 204, respectively.

The OF switch 200 comprises a receiver 205 which enables the OF switch 200 to receive a data plane packet 206. In case that the data plane packet 206 is of an unknown kind, i.e. no information is available for the OF switch 200 as how to further process this data plane packet 206 in the data plane (wherein such information could e.g. be stored in DFTs included in the OF switch 200), a PI message 208 is preferably generated by the OF switch 200 (in particular by a processor 209) according to the data plane packet 206. Subsequently, the PI message 208 is transmitted to an SDN controller by a transmitter 207, which is included in the OF switch 200. Typically, the SDN controller can reconfigure the OF switch 200 upon receipt of a PI message 208 e.g. by adding information to the OF switch 200 on how to further process the data plane packet 206 (this information typically is stored in at least one DFT, which can be included in the OF switch 200).

To ensure that PI messages 208 can be distinguished from each other, when being transmitted to the SDN controller by the transmitter 207 of the OF switch 200, the processor 209 of the OF switch 200 can determine, whether at least one information field 210 of the data plane packet 206 or of the PI message 208 matches the at least one service filed 203 of a CFE 202.

If the at least one information field 210 matches the at least one service field 203, the processor 209 instructs the transmitter 207 to transmit the PI message 208 according to the processing action 204 associated with the matched service field 203.

In case that the at least one information field 210 matches no service field 203, the processor 209 instructs the transmitter 207 to transmit the PI message 208 according to a default processing action.

Initial CFEs can be present in the SU 201, and an initial default processing action can be present in the OF switch 200, e.g. when the OF switch 200 is powered on. The initial CFEs and/or the initial default processing action can e.g. be preset by an operator of the OF switch 200. The initial CFEs and/or the initial default processing action can be updated and/or expanded during operation of the OF switch 200 by the SDN controller, as described below. In particular, the initial default processing action can be a predefined CFE among the initial CFEs.

Figure 3:
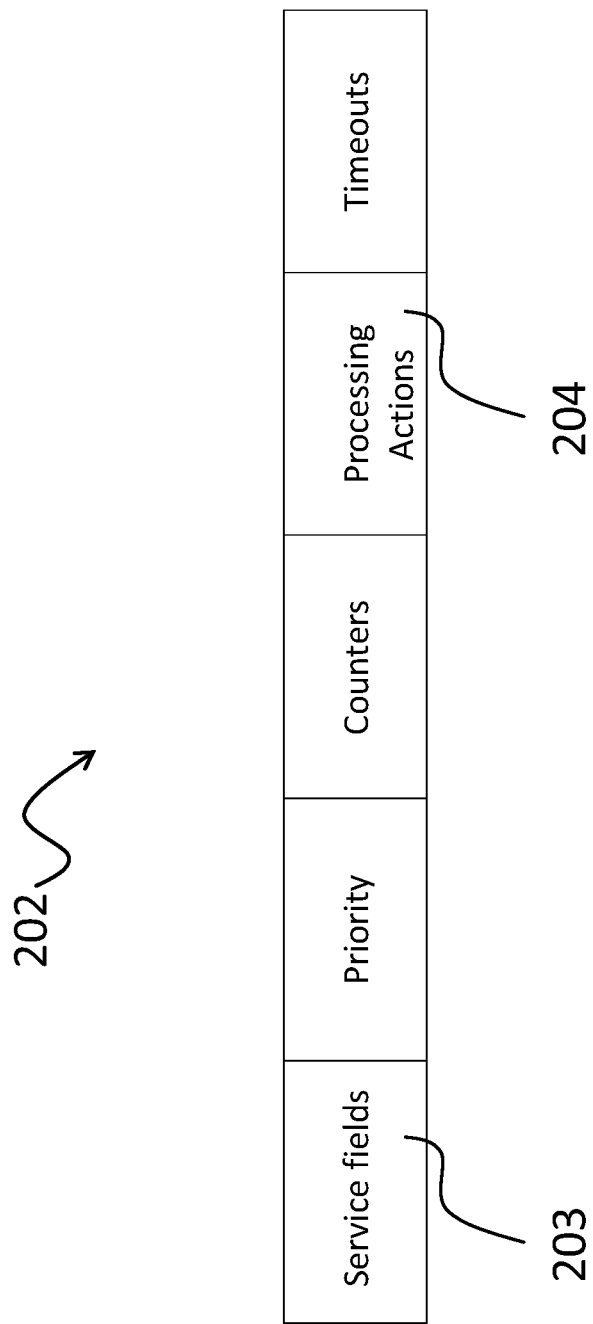
FIG. 3 shows a schematic overview of a control flow entry.

In the following, main components comprised by a CFE 202 are described in detail. In FIG. 3, a schematic overview of a CFE 202 is shown.

The CFE 202 comprises the at least one service field 203. The at least one service field 203 can include type and/or ownership information, which is to be matched against the at least one information field 210. The type information can be represented as a type of traffic. Example types of traffic are mobile broadband (MBB) traffic, machine type communication (MTC) traffic or vehicle to x (V2X) traffic. The traffic type can in particular be represented by a source port number and/or a destination port number and/or a used transmission protocol. The ownership information allows to distinguish to or from which user or operator a data plane packet 206 or a PI message 208 including the at least one information field 210 is sent. Specifically, the ownership information also allows distinguishing to or from which device type the data plane packet 206 or the PI message 208 including the at least one information field 210 is sent. Exemplary device types include mobile phones, vehicles, computers, sensors or network elements. The ownership information can in particular be represented by a source IP address and/or a destination IP address.

The CFE 202 additionally can comprise a priority value, which is optional. If the at least one information field 210 of the data plane packet 206 or of the PI message 208 matches service fields 203 of more than one CFE 202, the OF switch 200 can be configured to transmit the PI message 208 according to the processing action 204 associated with the matched service field 203 of a CFE 202 including the highest priority value. This can in particular be facilitated by the processor 209 instructing the transmitter 207.

The CFE 202 additionally can comprise counter values, which are optional. The OF switch 200 can be configured to update at least one of the counter values every time the service field 203 of the CFE 202 matches the at least one information field 210. This enables determining, how often the service field 203 of the CFE 202 is matched.

The CFE 202 additionally can comprise timeout values, which are optional. The timeout values can define a maximum amount of time before a CFE 202 expires, or a maximum amount of time since the service field 203 in the CFE 202 was matched for the last time, before a CFE 202 expires.

The CFE 202 also includes the at least one processing action 204, to which the at least one service field 203 is associated. According to the processing action 204, the processor 209 can instruct the transmitter 207 as how to transmit the PI message 208.

The processor 209 can in particular include the PI message 208 in a control packet and instruct the transmitter 207 to transmit the control packet to the SDN controller. The control packet can be any kind of packet suitable for being transmitted via a communication network.

It is noted that several PI messages 208 of a same type can be included in at least one control packet, which is sent to the SDN controller. PI messages 208 of different kinds are preferably enforced to be included in separate control packets before being sent to the SDN controller.

The at least one processing action 204 in particular can comprise labeling the control packet, and/or specifying a transportation preference of the control packet, and/or dispatching the control packet to a specific queue.

Labeling the control packet, which includes the PI message 208, can comprise assigning a priority context to a header field of the control packet, e.g. by labeling the DSCP field of the header of the control packet, in which the PI message 208 is encapsulated. The priority context can also be assigned to the header field of the control packet by labeling a priority code point (PCP) field of the header of the control packet. The priority context can further be assigned to the header field of the control packet by labeling a MPLS field of the header of the control packet. In a specific implementation example, labelling the control packet is achieved by forwarding labeling information, which is included in the at least one processing action 204 in the CFE 202 to a socket implementation of the OF switch 200. In the socket implementation of the OF switch 200, the control packet including the PI message 208 is labeled according to the labeling information.

Specifying the transportation preference of the control packet, which includes the PI message 208, can comprise forwarding the control packet to a predefined IP address, e.g. to a predefined IP address of a predefined SDN controller. This ensures that the control packet can be forwarded to a SDN controller which meets the performance requirements of the PI message 208 which is encapsulated in the control packet.

The control packet, which includes the PI message 208, can also be dispatched to a specific queue. In an OF switch 200, a queue typically is associated with a predefined physical output port of the OF switch 200. Output ports of the OF switch 200 can e.g. be connected to separate SDN controllers, wherein each SDN controller can comply with a predefined performance requirement. By dispatching the control packet, which includes the PI message 208, to a specific queue, it is possible for the OF switch 200 to forward the control packet to an SDN controller, which meets the performance requirements of the PI message 208 included in the control packet. In case that the OF switch 200 is connected to one or more SDN controllers by multiple OF channels, dispatching the control packet to a specific queue can also include dispatching the control packet to a predefined OF channel, which meets the performance requirements of the PI message 208 encapsulated in the control packet. As in the above example, PI message differentiation is enabled by means of different queues, header fields of the control packet, which includes the PI message 208, remain unchanged. An example implementation of a processing action 204, in which the control packet is dispatched to a specific queue, is shown in FIG. 4. FIG. 4 shows an exemplary source code fragment 400 of a processing action 204, which enables to set a specific queue ID for a control packet.

In case that the at least one information field 210 matches no service field 203 in the CFEs 202 of the SU 201, the control packet, which includes the PI message 208, can be transmitted according to the default processing action.

The default processing action can in particular be a predefined CFE 202, which is matched when no service field 203 in the other CFEs 202 of the SU 201 is matched. The default processing action typically is preset in the OF switch 200 by an operator of the OF switch 200. Specifically, the default processing action can include sending the PI message 208 or the control packet including the PI message 208 to a predefined SDN controller. This may ensure that all PI messages 208, which are generated in the OF switch 200, are sent to a predefined SDN controller by the OF switch 200, and that consequently no PI message 208 is lost.

A basic operating principle of the main components comprised by a CFE 202 (e.g. data structures used for the service fields 203, or action types used for the processing actions 204) can be based on a basic operating principle of conventional entries of DFTs.

Figure 5:
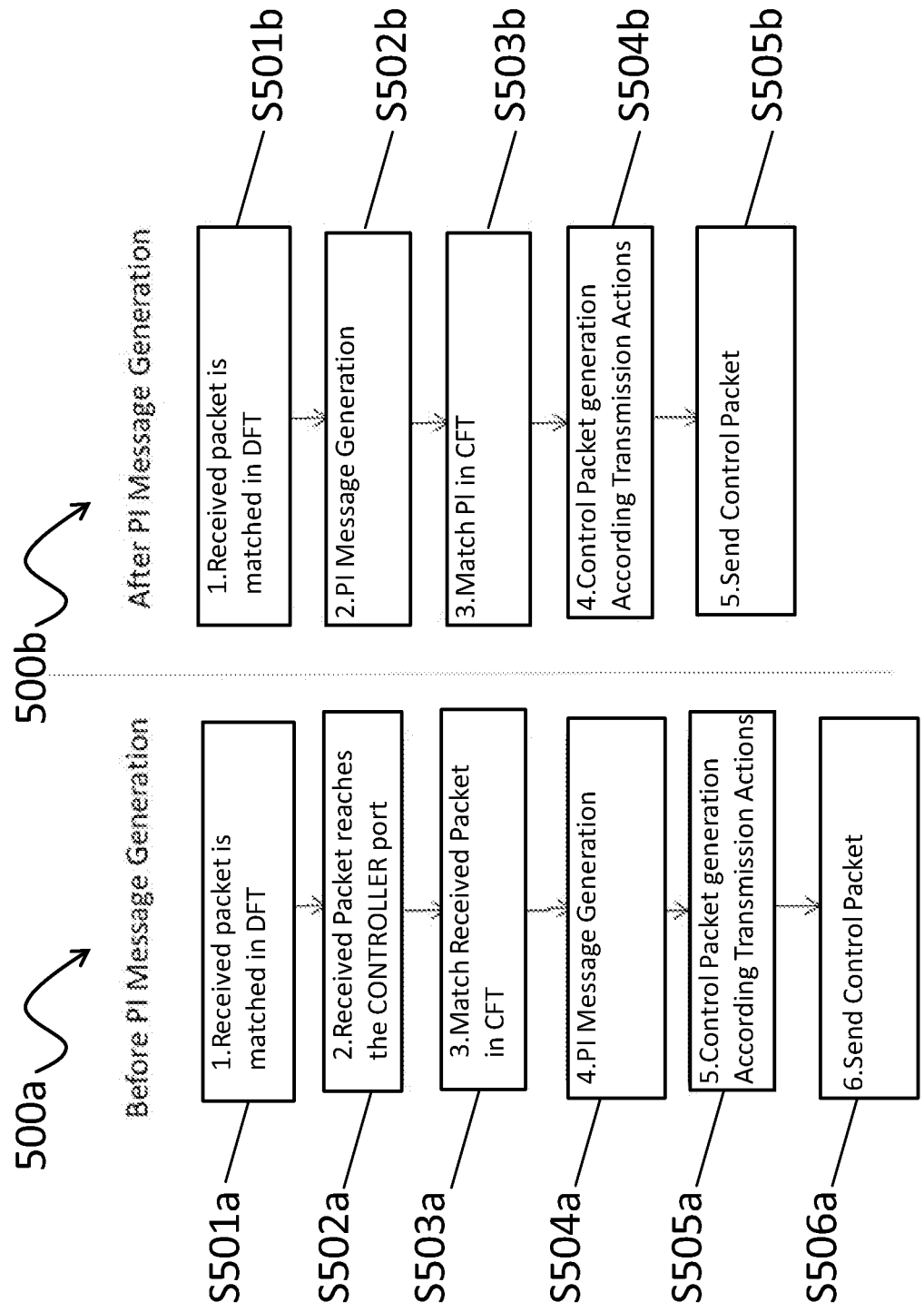
FIG. 5 shows flow-diagrams of methods of control packet generation and transmission according to the application.

FIG. 5 shows flow-diagrams of methods 500a, 500b of generation and transmission of PI messages 208 or control packets including PI messages 208 according to the application. As described in view of FIG. 5 below, the present application provides two alternative ways for comparing the at least one information field 210 with the at least one service field 203. In particular, the at least one information field 210 can be included in either the data plane packet 206 or the PI message 208.

When a data plane packet 206 arrives at the OF switch 200, the data plane packet 206 is matched against the entries of the DFT included in the OF switch 200, in order to determine how to further process the data plane packet 206 in the data plane. In case that in the DFT no entry was found about how to further process the data plane packet 206, an output port action of the DFT according to the OF specification is performed. Depending on the configuration of the output port action, the output port action either can provide the data plane packet 206 itself, or can provide the PI message 208, in which the data plane packet 206 or information related to the data plane packet 206, is encapsulated.

FIG. 5 shows a flow-diagram of a method 500a of an operating example of the OF switch 200, which illustrates how a PI message 208 or a control packet is generated and transmitted when the at least one information field 210 is included in the data plane packet 206. The method 500a comprises the following steps:

In step S501a, a data plane packet 206 is received by the OF switch 200 and is matched against the DFT.

In step S502a, the data plane packet 206 is provided by an output port action of the DFT for further processing. This action can also be referred to as the data plane packet 206 reaching a controller port (according to the OF specification, the controller port can be regarded as a port connecting the OF switch 200 with a SDN controller).

In step S503a, the data plane packet 206 is matched against the SU 201, in order to determine, whether the at least one information field 210 in the data plane packet 206 matches the at least one service field 203 of a CFE 202 included in the SU 201. To this end, information stored in the at least one information field 210 (i.e. at least one of a source IP address, a destination IP address, a source port number, a destination port number and a used protocol of the data plane packet 206) is compared with the at least one service field 203. As a result, either the processing action 204 according to the matched service field 203, or the default processing action may be determined.

In step S504a, a PI message 208 is generated from the data plane packet 206.

In optional step S505a, a control packet including the PI message 208 is generated according to the previously determined processing action 204 associated with the matched service field 203, or according to the default processing action. This step can be skipped, depending on the configuration of the OF switch 200.

In step S506a, the control packet is sent to an SDN controller according to the previously determined processing action 204, or according to the default processing action, if step S505a was not skipped. In step S506a, the PI message 208 is sent to an SDN controller according to the previously determined processing action 204, or according to the default processing action, if step S505a was skipped.

FIG. 5 also shows a flow-diagram of a method 500b of an operating example of the OF switch 200, which illustrates how a PI message 208 or a control packet is generated and transmitted when the at least one information field 210 is included in the PI message 208. The method 500b comprises the following steps:

In step S501b, a data plane packet 206 is received by the OF switch 200 and is matched against the DFT.

In step S502b, a PI message 208 is provided by an output port action of the DFT for further processing. This action can also be referred to as the PI message 208 reaching a controller port. In the PI message 208, the data plane packet 206, or information related to the data plane packet 206 is encapsulated.

In step S503b, the PI message 208 is matched against the SU 201, in order to determine, whether the at least one information field 210 in the PI message 208 matches the at least one service field 203 of a CFE 202 included in the SU 201. To this end, a payload of the PI message 208 is compared with the at least one service field 203. The payload of the PI message 208, which can in particular be information stored in the at least one information field 210, can comprise at least one of a source IP address, a destination IP address, a source port number, a destination port number and a used protocol obtained from the data plane packet 206. As a result of step S503b, either the processing action 204 according to the matched service field 203, or the default processing action can be determined.

In step S504b, a control packet including the PI message 208 is generated according to the previously determined processing action 204 associated with the matched service field 203 or according to the default processing action. This step can be skipped, depending on the configuration of the OF switch 200.

In step S505b, the control packet is sent to an SDN controller according to the previously determined processing action 204 or according to the default processing action, if step S504b was not skipped. In step S505b, the PI message 208 is sent to an SDN controller according to the previously determined processing action 204 or according to the default processing action, if step S504b was skipped.

Figure 6:
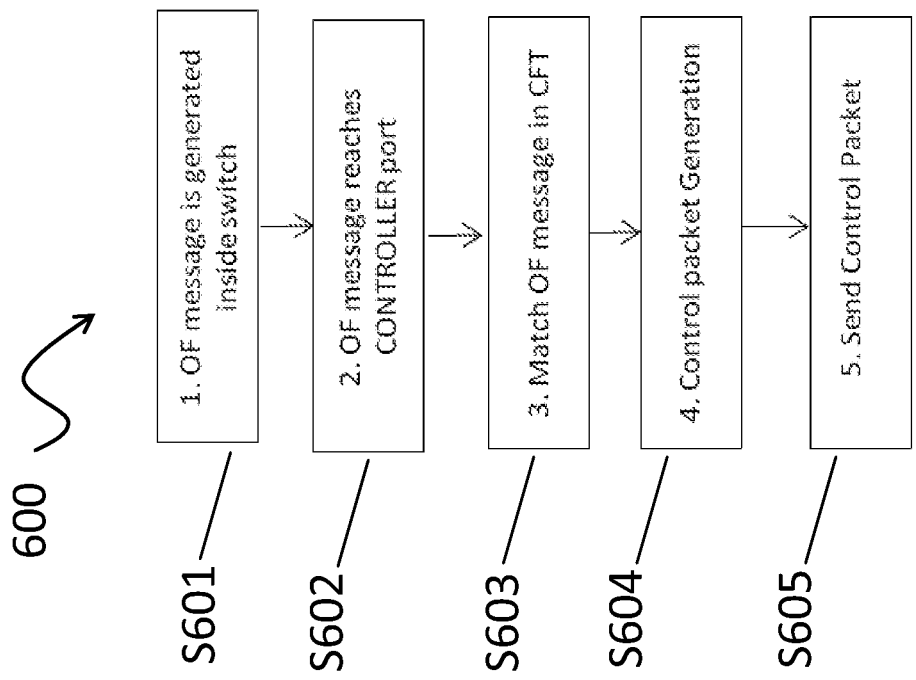
FIG. 6 shows a flow-diagram of a method of control packet generation and transmission according to the application.

As described with respect to FIG. 6, the present application is not limited to distinguishing PI messages or control packets which include PI messages 208. The OF switch 200 also can allow distinguishing any type of OF messages or control packets, which include any type of OF message, for example, an OF message of type OFPMP_FLOW_STATS, or an OF message of type OFPMP_AGGREGATE_STATS, or an OF message of type OFPT_PORT_STATUS. This is in particular enabled by including information regarding the OF message type in the at least one service field 203. The information regarding the OF message type can in particular be a value of a type field in an OF message header. With the information regarding the OF message type included in the at least one service field 203, the OF switch 200 can determine processing actions 204 depending on the type of the OF message among the CFEs 202 stored in the SU 201. OF messages or control packets can be generated and transmitted according to the processing action 204, or the default processing action depending on the type of the OF message.

FIG. 6 shows a flow-diagram of a method 600 of OF message or control packet generation and transmission for various types of OF messages. The method 600 includes the features of the methods 500a, 500b as described above, and comprises the following steps:

In step S601, an OF message is generated by the OF switch 200.

In step S602, the OF message is provided by an output port action of a DFT included in the OF switch for further processing. This action can also be referred to as the OF message reaching a controller port.

In step S603, the OF message is matched against the SU 201, in order to determine, whether at least one information field 210 in the OF message matches the at least one service field 203 of a CFE 202 included in the SU 201. To this end, the at least one service field 203 of a CFE 202 stored in the SU 201 can comprise information regarding the OF message type, in particular a value of a type field in an OF message header, which is matched against the at least one information field 210. As a result of step S603, either the processing action 204 according to the matched service field 203, or the default processing action can be determined.

In optional step S604, a control packet including the OF message is generated according to the previously determined processing action 204 associated with the matched service field 203 or according to the default processing action. This step can be skipped, depending on the configuration of the OF switch 200.

In step S605, the control packet is sent to an SDN controller according to the previously determined processing action 204 or according to the default processing action, if step S604 was not skipped. In step S605, the OF message 208 is sent to an SDN controller according to the previously determined processing action 204 or according to the default processing action, if step S604 was skipped.

Figure 7:
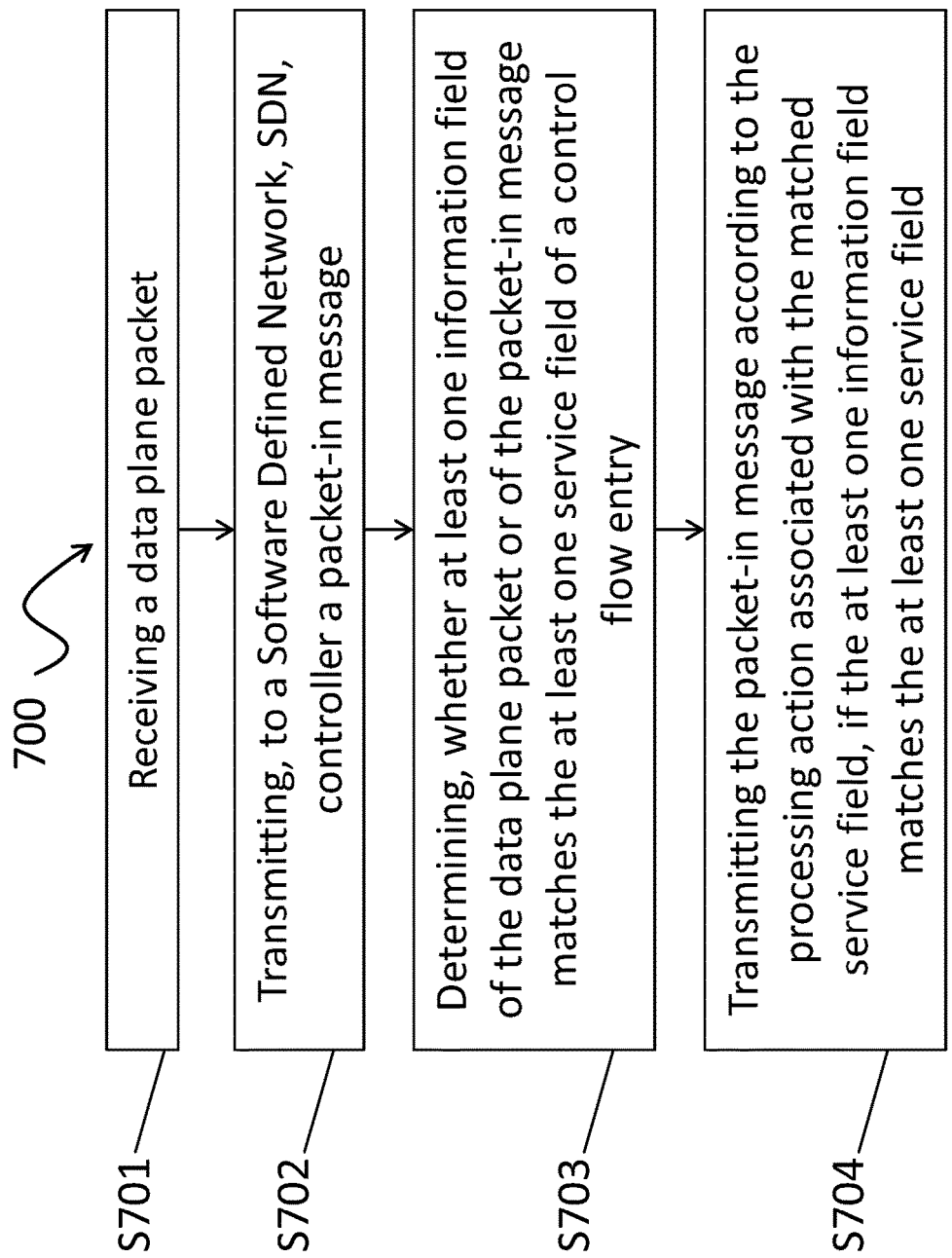
FIG. 7 shows a flow-diagram of a method according to an embodiment of the present application.

FIG. 7 shows a flow-diagram of a method 700 according to an embodiment of the present application. Preferably, the method is performed by the OF switch 200 as described above.

The method 700 comprises a first step of receiving S701 a data plane packet 206 by the OF switch 200.

Further, the method 700 comprises a second step of transmitting S702, to a SDN controller, a PI message 208 by the OF switch 200.

Further, the method 700 comprises a third step of determining S703 by the OF switch 200, whether at least one information field 210 of the data plane packet 206 or of the PI message 208 matches at least one service field 203 of a control flow entry 202.

Further, the method 700 comprises a fourth step of transmitting S704, by the OF switch 200, the PI message 208 according to a processing action 204 associated with the matched service field 203, if the at least one information field 210 matches the at least one service field 203.

Figure 8:
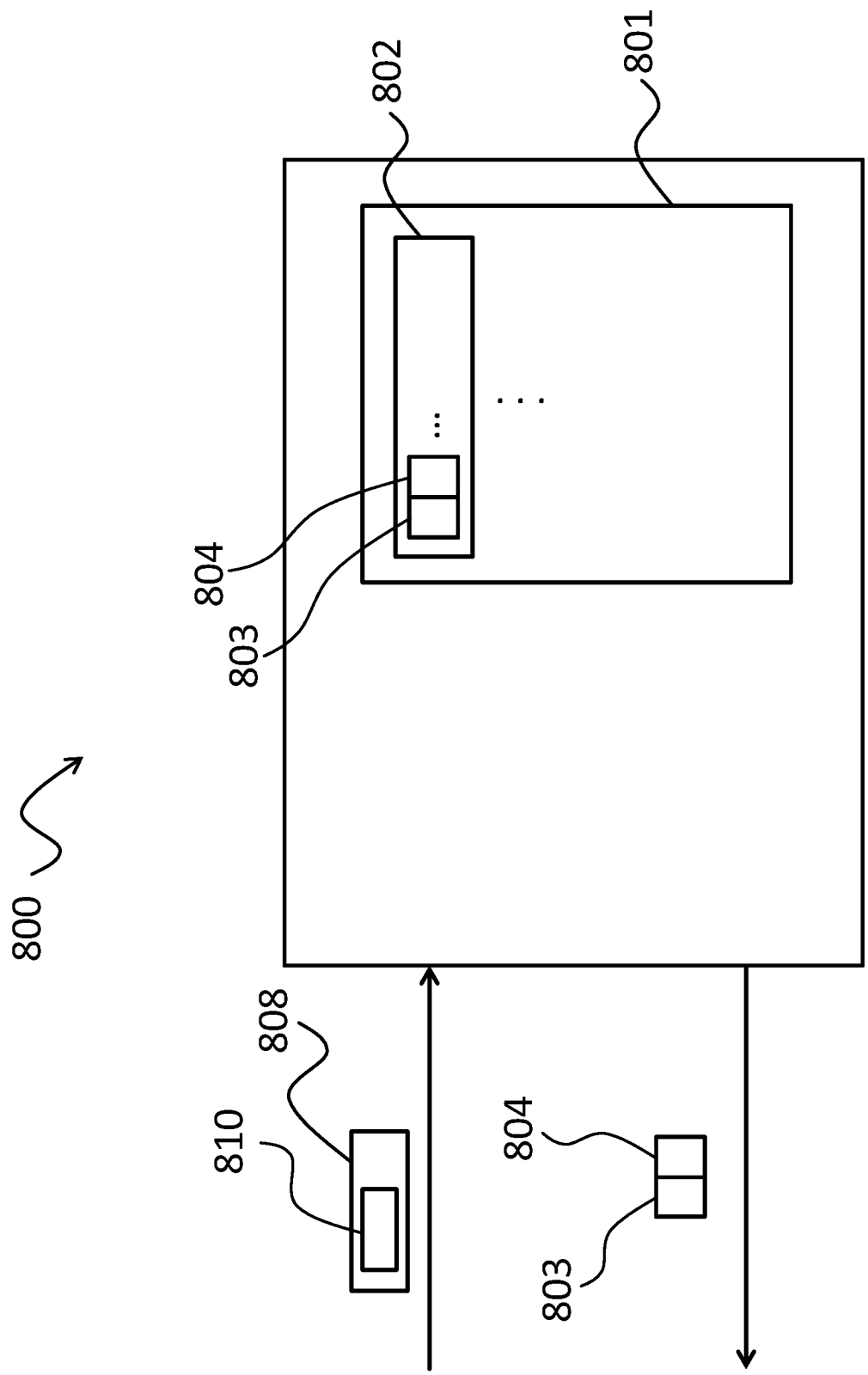
FIG. 8 shows a schematic overview of a SDN controller according to an embodiment of the present application.

FIG. 8 shows a schematic overview of a SDN controller 800 according to an embodiment of the present application.

To improve differentiation of PI messages 208 or control packets including PI messages 208, sent by the OF switch 200, the SDN controller 800 can configure the SU 201 of the OF switch 200. Therefore, the SDN controller 800 includes a control flow information database (CFID) 801, in which information is stored that allows to update the SU 201.

In case that the OF switch 200 lacks information in its DFT on how to correctly process an incoming data plane packet 206, the OF switch 200 can send a PI message 208, or a control packet including a PI message 208 to the SDN controller 800. Typically, this PI message 208 or control packet including the PI message 208 is sent by the OF switch 200 to the SDN controller 800 according to the default processing action.

The SDN controller 800 can look up information requested according to the PI message 208 or the control packet including the PI message 208 in its CFID 801, and provide a result of the lookup to the OF switch 200. Therefore, the CFID 801 is adapted to store control flow entries (CFEs) 802. Although there is only one CFE 802 shown in FIG. 8, the CFID 801 can store a plurality of CFEs 802. Each CFE 802 comprises at least one service field 803, which is associated with at least one processing action 804. Although there is only one service field 803 and only one processing action 804 shown in FIG. 8, each SU 802 can comprise a plurality of service fields 803 and/or an arbitrary number of processing actions 804. The CFID 801 includes all function and features of the SU 201, the CFEs 802 include all function and features of the CFEs 202, the service fields 803 include all function and features of the service fields 203, and the processing actions 204 include all function and features of the processing actions 804. This enables the SDN controller 800 to maintain, in the CFID 801, all CFEs 202 of the OF switches 200, which are connected to the SDN controller 800. The SDN controller 800 can provide interfaces, which enable SDN applications to control the configuration of the SDN controller 800 and the configuration of the CFID 801. Specifically, the SDN applications can communicate with the SDN controller 800 by means of a northbound API.

To provide the OF switch 200 with the requested information, the SDN controller 800 can receive a PI message 808 or a control packet including a PI message 808 from an OF switch 200. The control packet or the PI message 808 received by the SDN controller 800 are the control packet and the PI message 208 sent by the OF switch 200. The PI message 808 or the control packet including the PI message 808 can in particular be the PI message 208 or the control packet including the PI message 208 which is sent by the OF switch 200 according to the default processing action.

In turn, the SDN controller 800 determines, whether at least one information field 810 included in the PI message 808 matches the at least one service field 803 in the CFE 802. To provide the information to the OF switch 200, which was requested by means of the PI message 208 or the control packet including the PI message 808, the SDN controller 800 can transmit to the OF switch 200 the processing action 804, which is associated with the matched at least one service field 803. The SDN controller 800 can also process the PI message 208 according to the processing action 804.

In case that the information, which is requested by the OF switch 200 by means of the control packet, cannot be found in the CFID 801, the SDN controller 800 can change in and/or add to the CFID 801 a CFE 802. The CFE 802 can in particular be provided to the SDN controller 800 by means of SDN applications which are connected to the SDN controller 800 via the northbound API. A processing logic in the SDN applications can be used to generate the CFE 802 according to the PI message 808. The CFE 802 can, however, also be generated in the SDN controller 800 according to the PI message 808. In order to provide the OF switch 200 with the information that initially could not be found in the CFID 801, the SDN controller 800 can transmit the changed CFE 802 to the OF switch 200. In particular, the SDN controller 800 can transmit, to the OF switch 200, a processing action 804, which is associated with at least one service field 803 of the CFE 802 that is changed or added.

In a specific implementation example, updating a CFE 802 in the CFID 801 e.g. by means of the SDN applications, triggers the SDN controller 800 to transmit the updated CFE 802 to the OF switch 200.

In another specific implementation example, the SDN controller 800 can use extended OF messages to configure the SUs 201 of the OF switches 200, which are connected to the SDN controller 800. OF messages of type OFPT_FLOW_MOD and OFPT_TABLE_MOD are typically used to configure DFTs. Extended values of the "table_id" field of the OF message of type OFPT_FLOW_MOD and OFPT_TABLE_MOD can indicate that the OF message of type OFPT_FLOW_MOD and OFPT_TABLE_MOD are used to configure SUs 201. In another implementation example, a new Boolean field "table_type" is introduced in extended OF messages of type OFPT_FLOW_MOD and OFPT_TABLE_MOD to distinguish, whether a DFT or a SU 201 of an OF switch 200 is addressed. In another implementation example, new OF message are used to configure the SUs 201 by the SDN controller 800. The SDN controller 800 can modify CFEs 202 of the SU 201 by a new OF message of type OFPT_CFT_MOD and use a new OF message of type OFPT_CFT_FLOW_MOD to configure a dynamic state in a SU 201 of the OF switch 200. The new OF message OFPT_CFT_MOD shares the same structure as a conventional OF message of type OFPT_FLOW_MOD and the new OF message OFPT_CFT_FLOW_MOD shares the same structure as a conventional OF message of type OFPT_TABLE_MOD.

In order to enable differentiation of PI messages 808 or differentiation of control packets including PI messages 808 in the SDN controller 800, the SDN controller can determine, whether the received control packet is a labeled control packet and/or a control packet with a specified transportation preference, and/or a control packet dispatched to a specific queue. The SDN controller 800 can process the control packet according to its labelling, and/or its transportation preference and/or the specified queue. This e.g. allows that, in the SDN controller 800, PI messages 808 that relate to V2X traffic, are processed with a higher priority than PI messages 808 that relate to other traffic.

Figure 9:
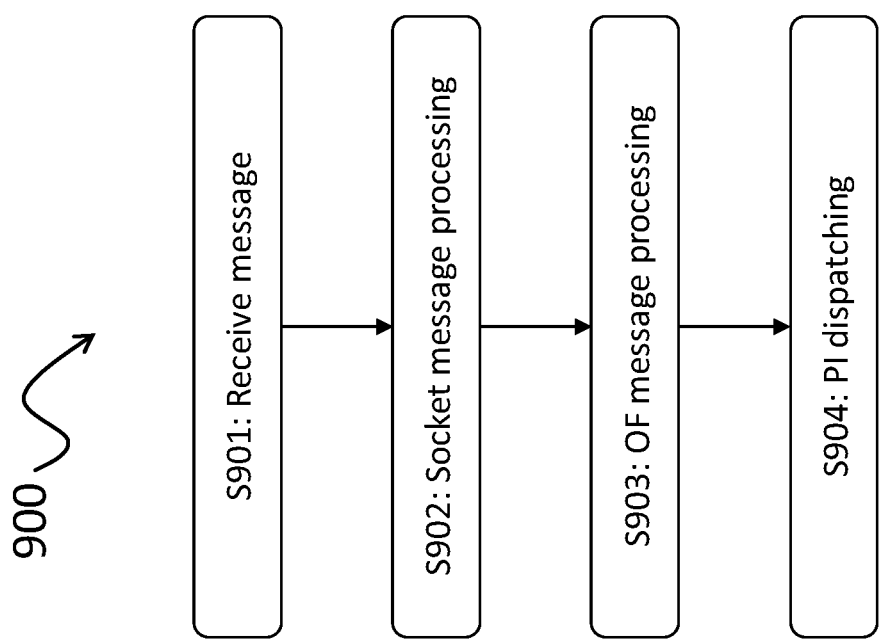
FIG. 9 shows a flow-diagram of control packet processing in the SDN controller according to an embodiment of the present application.

The advantages of differentiating PI messages 808 or control packets including PI messages 808 at the SDN controller 800 are now described in view of FIG. 9. FIG. 9 shows a flow-diagram of a method 900 of processing PI messages 808 or control packets including PI messages 808 in the SDN controller 800. The method comprises the following steps:

In step S901, a PI message 808 or a control packet including a PI message 808 is received by the SDN controller 800.

In step S902, socket message processing is applied to the received PI message 808 or the received control packet including the PI message 808. At the stage of socket message processing, it can in particular be determined by the SDN controller 800, whether the received control packet is a labeled control packet and/or a control packet with a specified transportation preference and/or a control packet that was dispatched to a specific queue. This allows to determine the priority of the received control packet and to perform the steps S903 and S904 according to the priority required by the received control packet.

In step S903, an OF message, e.g. a PI message 808 is extracted from the control packet, in case that a control packet including a PI message 808 was received by the SDN controller 800.

In step S904, a processing action 804 or a SU 802 are provided to the OF switch 200 according to the received PI message 808.

Figure 10:
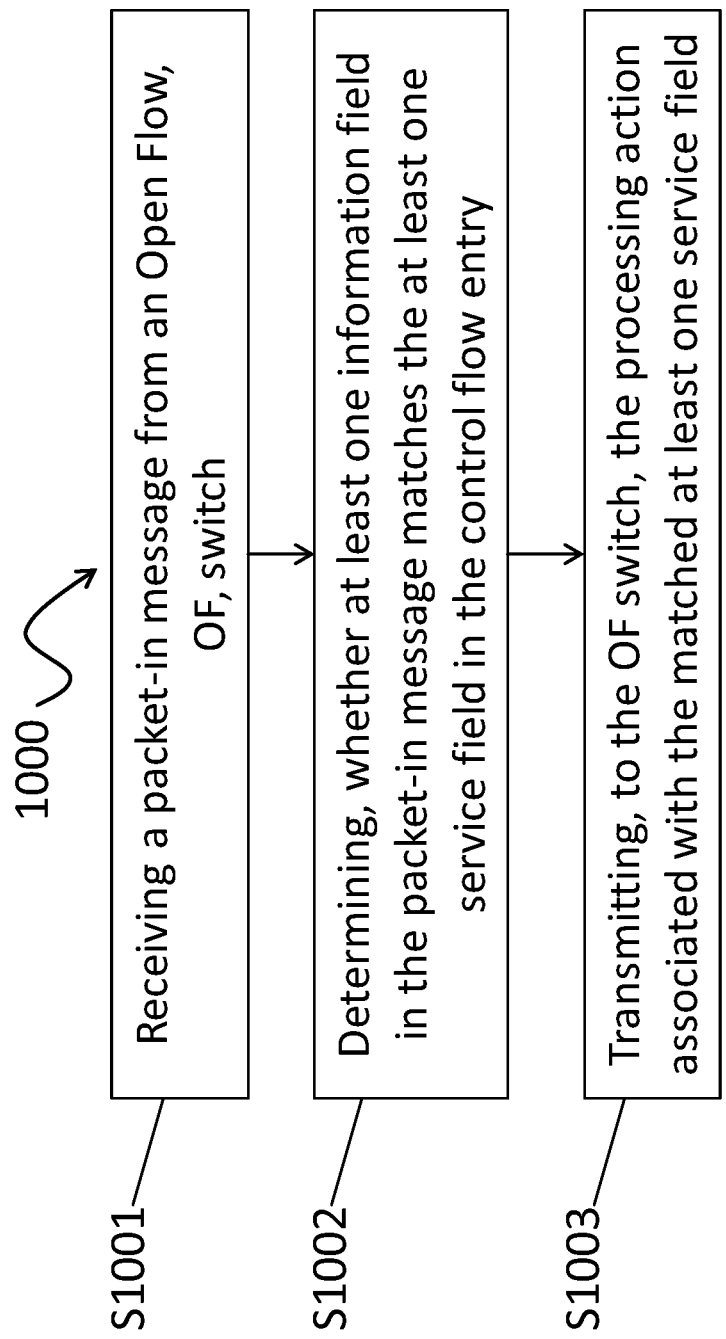
FIG. 10 shows a flow-diagram of a method according to an embodiment of the present application.

FIG. 10 shows a flow-diagram of a method 1000 according to an embodiment of the present application. Preferably, the method is performed by the SDN controller 800 as described above.

The method 1000 comprises a first step of receiving S1001 by the SDN controller 800 a packet-in message 808 from an OF switch 200.

Further, the method 1000 comprises a second step of determining S1002, by the SDN controller 800, whether at least one information field 810 in the packet-in message 808 matches at least one service field 804 in a control flow entry 803.

Further, the method 1000 comprises a third step of transmitting S1003, by the SDN controller 800 to the OF switch 200, a processing action 804 associated with the matched at least one service field 803.

Figure 11:
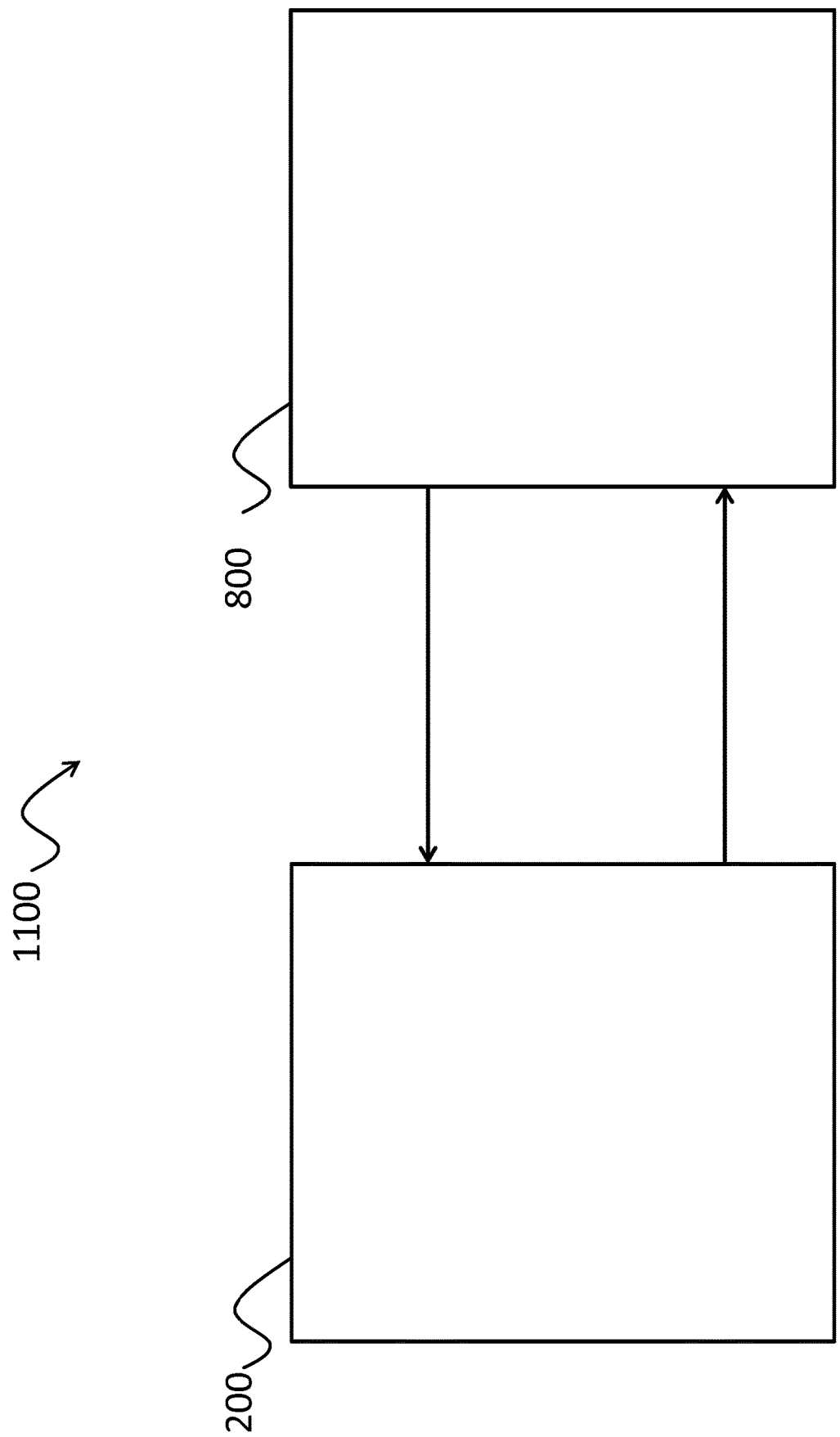
FIG. 11 shows a schematic overview of a system according to an embodiment of the present application.

FIG. 11 shows a schematic overview of a system 1100 according to an embodiment of the present application. In FIG. 11, the system 1100 comprises one OF switch 200 and one SDN controller 800. Although in FIG. 11 there is one OF switch 200 and one SDN controller 800 shown each, the system 1100 can include and arbitrary number of OF switches 200 and an arbitrary amount of SDN controllers 800, as long as there is at least one instance each.

In the system 1100, the OF switch 200 and the SDN controller 800 can communicate with each other, in particular by exchanging the PI messages 208, 808, the control messages and/or the processing actions 804 associated with the service fields 803 and/or CFEs 202, 802. Specifically, one OF switch 200 can communicate with multiple SDN controllers 800, multiple OF switches 200 can communicate with one SDN controller 800, and multiple OF switches 200 can communicate with multiple SDN controllers 800.

Figure 12:
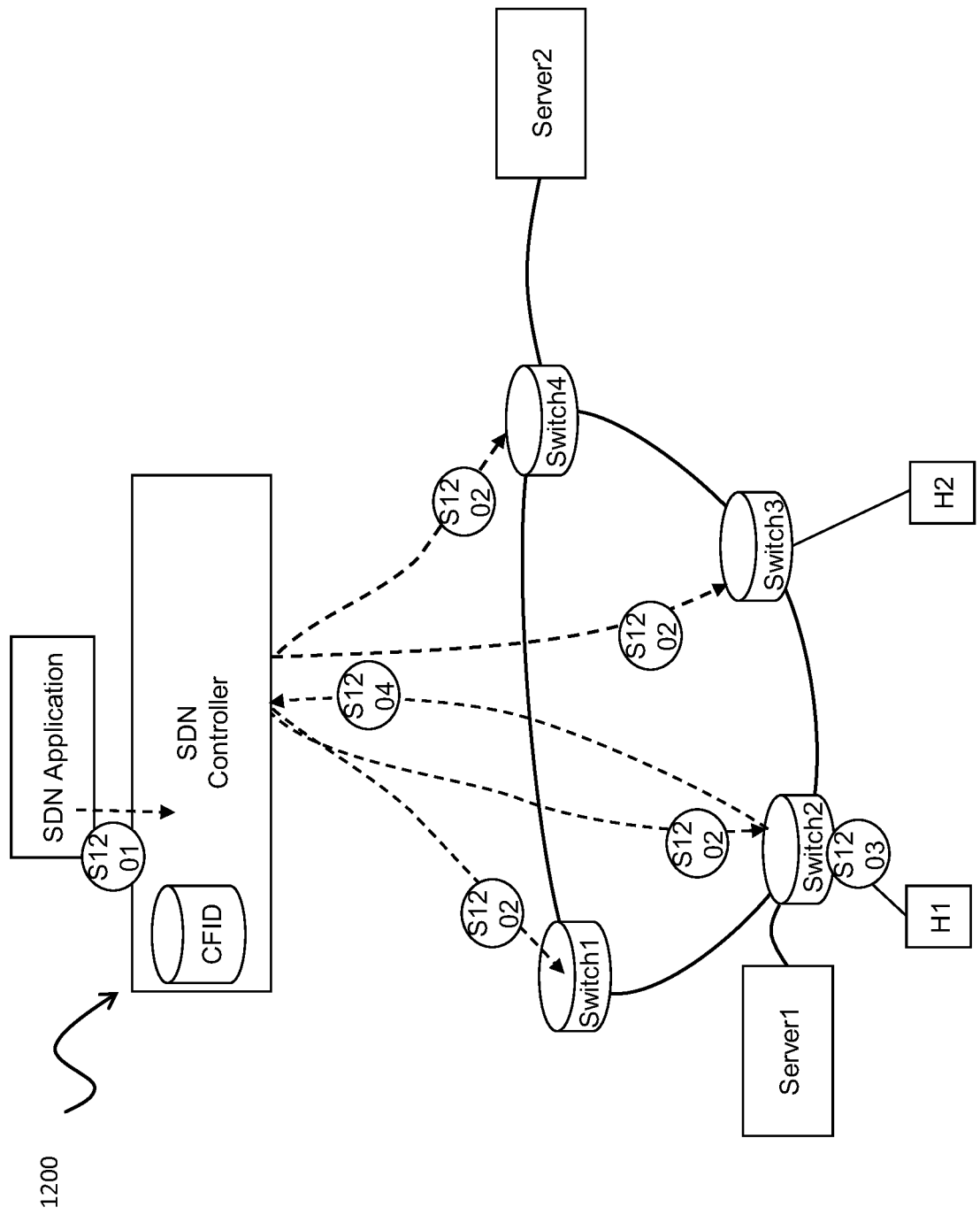
FIG. 12 shows an example operating scenario of a system according to an embodiment of the present application.

In the following, an example operating scenario of a system 1100 according to an embodiment of the present application is described. FIG. 12 shows an example operating scenario of a system 1100 according to an embodiment of the present application.

FIG. 12 shows an SDN controller, which operates according to the operating principle of the SDN controller 800 and a number of switches (Switch1, Switch2, Switch3 and Switch4), which all operate according to the operating principle of the OF switch 200. The SDN controller comprises a CFID. An SDN application is connected to the SDN controller, e.g. by means of a northbound API. A host H1 and a server Server1 are connected to the switch Switch2, while a server Server2 is connect to the switch Switch4. The operating example as described in view of FIG. 12 contains a configuration phase (S1201, S1202) and an operating phase (S1203, S1204).

In step S1201, the SDN application defines a CFE, which specifies how a PI message that is triggered by traffic type A (e.g. V2X traffic) should be handled. The SDN application passes the defined CFE to the SDN controller, where it is stored in the CFID.

In step S1202, the SDN controller configures the SU of each switch by a Controller-to-Switch control packet based on the received CFE. For instance, the SDN controller transmits the CFE, which was defined by the SDN application, to each switch. The configuration of the SU of each switch can be triggered by two scenarios:

Proactive SU configuration: Once an SDN application or the SDN controller itself defines/updates a CFE, this updated CFE is automatically propagated from the SDN controller to the SU of the switches, and the CFID is updated. The CFE definitions/updates can happen once a SDN application associates with a SDN controller, but can also happen dynamically.

Reactive SU configuration: The SDN controller receives a control packet including a PI message, which was transmitted by one of the switches to the SDN controller, by a default processing action, it can analyse if the PI message from this type of traffic is associated with a specific processing. In particular, the SDN controller can look up in its CFID, whether the CFID contains a CFE which matches the PI message, and then transmits that matched CFE to the SU of the switch, which sent the control packet including the PI message to the SDN controller. For the next PI messages of the same type, the OF switch can then use the processing action of the newly installed CFE, instead of the default processing action.

In step S1203, the host H1 tries to connect to the server Server1 by sending a data plane packet to the switch Switch2, wherein a destination of the data plane packet is the server Server1. The switch Switch2 does not have any flow rules to handle the data plane packet in its DFT. The switch Switch2 generates a PI message, in order to request a flow rule to handle the data plane packet. A control packet that transmits the PI message from the switch Switch2 to the SDN controller is labeled according to a CFE stored in a SU of the switch Switch2, and is sent to the SDN controller.

In step S1204, the control packet including the PI message is transported within the transport network received by the SDN controller. The SDN controller forwards the control packet including the PI message to the SDN application for further processing. The priority for forwarding the control packet including the PI message is determined according to the label of the control packet.

According to another embodiment, the present application provides computer programs comprising program code for performing the methods performed by the OF switch 200 or the SDN controller 800. The computer programs can be stored on a storage medium each. The storage medium may be a computer readable storage medium, such as, but not limited to, any type of disk including floppy disks, optical disks, CD-ROMs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

The application has been described in conjunction with various embodiments herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless telecommunication systems.

What is claimed is:

1. A switch device, comprising:
   a storage medium configured to store one or more control flow entries, wherein each control flow entry comprises at least one service field associated with at least one processing action;
   a receiver configured to:
     receive a data plane packet; and
     receive, from a Software Defined Network (SDN) controller, a default processing action;
   a processor configured to:
     determine whether at least one information field of the data plane packet matches the at least one service field of a control flow entry;
     instruct a transmitter to transmit a packet-in message according to the processing action associated with the matched service field based on the at least one information field matching the at least one service field; and
     instruct the transmitter to transmit the packet-in message according to the default processing action based on the at least one information field of the data plane packet not matching any service field of the at least one service field; and
   the transmitter configured to transmit, to the SDN controller, the packet-in message,
   wherein the at least one service field includes type and ownership information of data plane packets.

2. The switch device according to claim 1, wherein the processor is further configured to:
   compare at least one of: a source internet protocol (IP) address, a destination IP address, a source port number, a destination port number or a used protocol of the data plane packet with the at least one service field.

3. The switch device according to claim 1, wherein the processor is further configured to:
   compare a payload of the packet-in message with the at least one service field.

4. The switch device according to claim 3, wherein the payload of the packet-in message comprises at least one of: a source internet protocol (IP) address, a destination IP address, a source port number, a destination port number or a used protocol obtained from the data plane packet.

5. The switch device according to claim 1, wherein the packet-in message is transmitted in a control packet, and wherein the processing action comprises one or more of the following:
   labeling the control packet,
   specifying a transportation preference of the control packet, or
   dispatching the control packet to a specific queue.

6. The switch device according to claim 1, wherein a priority value is stored in each control flow, and
   if the at least one information field of the data plane packet matches service fields of more than one control flow entry, a processing action of the control flow entry with the highest priority is performed.

7. A method performed by a switch device, wherein the switch device stores one or more control flow entries, each control flow entry comprising at least one service field associated with at least one processing action, the method comprising:
   receiving a data plane packet;
   receiving, from a Software Defined Network (SDN) controller, a default processing action;
   determining whether at least one information field of the data plane packet matches the at least one service field of a control flow entry;
   transmitting a packet-in message according to the processing action associated with the matched service field based on the at least one information field matching the at least one service field; and
   transmitting the packet-in message according to the default processing action based on the at least one information field of the data plane packet not matching any service field of the at least one service field,
   wherein the at least one service field includes type and ownership information of data plane packets.

8. The method according to claim 7, further comprising:
   comparing at least one of: a source internet protocol (IP) address, a destination IP address, a source port number, a destination port number or a used protocol of the data plane packet with the at least one service field.

9. The method according to claim 7, further comprising:
   comparing a payload of the packet-in message with the at least one service field.

10. The method according to claim 9, wherein the payload of the packet-in message comprises at least one of: a source internet protocol (IP) address, a destination IP address, a source port number, a destination port number or a used protocol obtained from the data plane packet.

11. The method according to claim 7, wherein the packet-in message is transmitted in a control packet, and wherein the processing action comprises one or more of the following:
   labeling the control packet,
   specifying a transportation preference of the control packet, or
   dispatching the control packet to a specific queue.

12. The method according to claim 7, wherein a priority value is stored in each control flow, and if the at least one information field of the data plane packet matches service fields of more than one control flow entry, a processing action of the control flow entry with the highest priority is performed.

13. A software defined network (SDN) controller, comprising:
   a control flow information database configured to store one or more control flow entries, wherein each control flow entry comprises at least one service field associated with at least one processing action;
   a receiver, configured to receive a packet-in message from a switch device;
   a transmitter, configured to transmit a default processing action to the switch device; and
   a processor, configured to:
     determine whether at least one information field in the packet-in message matches the at least one service field in the control flow entry; and
   process the packet-in message according to the processing action or instruction the transmitter to transmit, to the switch device, the processing action associated with the matched at least one service field, wherein the at least one service field includes type and ownership information of data plane packets.

14. The SDN controller according to claim 13, wherein the processor is further configured to:
    change in or add to the control flow information database a control flow entry, and the transmitter is further configured to transmit, to the switch device, the changed control flow entry.

15. The SDN controller according to claim 13, wherein the receiver is further configured to:
    receive a control packet including the packet-in message from the switch device, the processor is further configured to:
    determine, whether the control packet is a labeled control packet, a control packet with a specified transportation preference, or a control packet dispatched to a specific queue, and
    process the control packet or the packet-in message according to the labeling, the transportation preference, or the queue of the control packet.

16. A method performed by a software defined network (SDN) controller, wherein the SDN controller comprises a control flow information database storing one or more control flow entries, each control flow entry comprises at least one service field associated with at least one processing action, the method comprising:
    transmitting, to a switch device, a default processing action;
    receiving a packet-in message from the switch device;
    determining whether at least one information field in the packet-in message matches the at least one service field in the control flow entry; and
    transmitting, to the switch device, the processing action associated with the matched at least one service field, wherein the at least one service field includes type and ownership information of data plane packets.

17. The switch device according to claim 1, wherein the memory is further configured to store an initial default processing action, and wherein the default processing action that is received from the SDN controller is an updated or expanded default processing action.

18. The SDN controller according to claim 13, wherein the receiver is configured to receive the packet-in message from the switch device based on the default processing action.

* * * * *